(12) United States Patent
Andersen et al.

(10) Patent No.: US 8,615,866 B2
(45) Date of Patent: Dec. 31, 2013

(54) METHOD OF MANUFACTURING A ROTOR

(75) Inventors: Kurt Andersen, Vorbasse (DK); Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 13/075,202

(22) Filed: Mar. 30, 2011

(65) Prior Publication Data

US 2011/0247196 A1 Oct. 13, 2011

(30) Foreign Application Priority Data

Apr. 8, 2010 (EP) ..................................... 10159375

(51) Int. Cl.
*H02K 15/02* (2006.01)
*H02K 15/10* (2006.01)

(52) U.S. Cl.
USPC ................. 29/598; 29/421.1; 29/596; 72/58; 72/62; 72/370.22; 72/370.23

(58) Field of Classification Search
USPC ................. 29/598, 421.1, 596; 72/58, 60, 62, 72/370.22, 370.23, 709
See application file for complete search history.

(56) References Cited

U.S. PATENT DOCUMENTS

| | | |
|---|---|---|
| 1,931,153 A | 10/1933 | Mueller |
| 2,263,714 A | 11/1941 | Bloomfield et al. |
| 5,224,259 A | 7/1993 | Rode |
| 5,339,667 A * | 8/1994 | Shah et al. ........................ 72/58 |
| 7,024,897 B2 * | 4/2006 | Pfaffmann et al. ............... 72/60 |

* cited by examiner

*Primary Examiner* — Thiem Phan

(57) ABSTRACT

A method of monitoring quality of a control circuit in a power plant is provided. The quality of the control circuit is continuously assessed by determining characteristic quantities describing the quality by applying a plurality of testing methods suitable for describing dynamic properties of the control circuit to current operating data originating from the instrumentation and control equipment of the power plant, and by evaluating the characteristic quantities.

17 Claims, 3 Drawing Sheets

METHOD OF MANUFACTURING A ROTOR

CROSS REFERENCE TO RELATED APPLICATIONS

This application claims priority of European Patent Office Application No. 10159375.4 EP filed Apr. 8, 2010, which is incorporated by reference herein in its entirety.

FIELD OF INVENTION

The invention concerns a method and an apparatus for manufacturing a rotor for an electrical machine, in particular a rotor yoke for a wind turbine generator.

BACKGROUND OF INVENTION

Hollow shafts of a large diameter, for example, a diameter of more than one meter, are needed as rotors for some special applications. An example for such an application is a wind turbine, where such a hollow shaft is usually used as a rotor yoke for a wind turbine generator, for example a direct drive wind turbine generator.

Such a rotor yoke of a generator for a large scale modern wind turbine can be built up of a cylinder of rolled steel, having a steel thickness of about 40 mm and a diameter of for example, four meters for an outer rotor type generator. Rotors for inner rotor type generators are somewhat smaller in diameter.

The manufacture of such a rotor yoke must take into account some specifications, for example certain textures of the inner and the outer surface, in particular for receiving magnets, and demanding requirements regarding the tolerance of the diameter, which can e.g. be in the order of plus/minus 0.5 mm from the desired diameter.

To manufacture such a rotor, it is known to process a hollow cylinder using machining tools, for example a specialized lathe for multiple machining process steps, until the desired low tolerance of the rotor is achieved. These processing steps are time consuming and expensive steps of the manufacturing process. Consequently, such generators, in particular direct drive generators, are seldom used, despite the other advantages this kind of generator has.

SUMMARY OF INVENTION

It is an object of the invention to provide a manufacturing method for a rotor for an electrical machine, especially a rotor yoke for a wind turbine generator, which excessively reduces the manufacturing time and costs.

This object is solved by a method including the steps of
providing a hollow rolled metal cylinder, in particular a rolled steel cylinder, and
plastically deforming the cylinder permanently to a predetermined shape and a predetermined size.

The present invention suggests a totally new approach in the manufacture of rotors of a large size, such as of one meter or more in diameter, in particular rotor yokes, namely processing the rolled cylinder not by machining, but by forming techniques. Hence, known forming techniques can be used. In particular, the step of plastically deforming the cylinder can comprise cold forming and/or hot forming and/or work hardening the cylinder. In short, the method can be described as forcing a rolled steel or rolled iron cylinder to permanently plastically deform to a desired shape and size, in particular of a wind turbine generator rotor yoke.

The method therefore provides an alternative technique to obtain, for example, a rotor fulfilling the requirements to inner surface tolerance and surface texture.

Advantageously, the inventive processing is very time saving, as, for example, a pressing process may take only from a few seconds to a few minutes, whereas the known technique of machining may take hours. Additionally, the inventive method is, once established, very cost efficient, because a very high manufacturing rate of multiple rotors per hour per apparatus can be achieved, whereas the known method only allows for a rate of less than one rotor per hour and apparatus.

Another advantage of the present invention is that it does not remove rotor material from the rotor during the manufacturing process as opposed to the known methods using machining, for example by using a turning machine.

As already mentioned, the forming process can in some embodiments of the invention be performed as cold forming. The metal cylinder, in particular the steel cylinder, is deformed at a temperature substantially below the recrystallization point of the material, for example at room temperature. Cold forming increases the yield strength and hardness of the plate material by introducing defects into the material's crystal structure, resulting in hardening.

In another embodiment, the forming process can be performed as a hot forming process. The metal cylinder, in particular the steel cylinder, is in this case heated above its recrystallization point and the deformed. Hot forming allows large deformations to be achieved and prevents residual stress from accumulating in the material, which ensures good dimensional stability. For example, temperatures of about 600 to 700 degrees Celsius can be used.

As already mentioned above, the first step of the method comprises providing a hollow metal cylinder, in particular a hollow steel cylinder. The cylinder should have a suitable wall thickness, for example in the range of 35 mm to 55 mm, and the length/height of the cylinder should be substantially the length/height of the desired finished rotor, in particular rotor yoke. The cylinder can be made from any suitable metal, in particular iron, or metal alloy, in particular any suitable steel alloy.

In a preferred embodiment, a pressing means is arranged inside or around the cylinder, applying a pressing force to at least a part of the inner or outer surface of the cylinder. In such an embodiment, the cylinder can be provided having a diameter slightly smaller than the desired final diameter of the rotor. The pressing means can now apply a sufficient force to one or more areas of the cylinder, so that the desired inner diameter is achieved. Preferably, a pressing force in a radial direction of the cylinder is applied. In any case, the force generated by the pressing means must be sufficient to allow the cylinder material to reach a plastic deformation state.

In an advantageous embodiment, the surface of the pressing means contacting the cylinder is structured such that the contacted surface of the cylinder takes a predetermined texture. In this manner, the inner or outer surface of the cylinder can be structured while the pressing is in progress. The pressing means can be designed to allow the forming of inner or outer surfaces of the rotor of various textures. For example, if a rotor yoke or the like is to be manufactured, the texture made may have, in a cross-sectional view, the form of a polygon composed of a finite sequence of straight line segments. The number of these segments can correspond to the number of pole magnets to be mounted to the rotor subsequently.

As a preferred further development of the inventive method, the pressing force is applied while the cylinder is arranged inside a cavity of an outer matrix or an outer mould surrounding and/or supporting the cylinder. While embodiments are conceivable in which the mould element only works as a support for the cylinder, the mould element may preferably also define the outer size and shape of the finished product, such that, in a concrete embodiment, the provided cylinder, which has an outer diameter smaller than the inner diameter of the mould element, may be inserted into the cavity. In a further step, the pressing means is inserted into the cylinder. Once the pressing force is exerted, the cylinder is plastically deformed such that its outer diameter and shape is defined by the mould element, as the cylinder is pressed into the mould element, and the inner diameter and shape of the cylinder are defined by the pressing means/forces. Of course, in principle also an embodiment wherein the mould element is placed inside the cylinder and the pressing means contact the outside of the cylinder is also conceivable, applying the aforementioned features and the following features mutatis mutandis.

A mould element comprising a layer of armoured concrete may be used, forming a solid tube of suitable thickness. Preferably, a mould element comprising a matrix structure, in particular at least one protrusion, corresponding to a desired predetermined outer texture of the rotor on its inner wall can be used. The matrix structure forms the transition between the mould element and its cavity. The matrix structure may be at least partially, specially hardened. While the matrix structure may be realized as a part of the main layer of the mould, preferably a moulding element having an in particular replaceable matrix structure insert is used. In the method a matrix structure corresponding to a desired predetermined outer texture of the rotor may be inserted into the mould element, thereby forming the walls of the cavity. By using a replaceable insert, it can be replaced when it is worn out or can be replaced with other inserts defining other outer textures, for example having protrusions of other forms, dependent on the rotor to be manufactured.

The matrix structure, or more specifically, the at least one protrusion, may take various forms, in particular various heights, various widths and various shapes such as triangular, square or sine shaped.

The pressing means may apply pressure on the cylinder using hydraulic and/or electric and/or mechanical means. Suitable pressing means are known in the state of the art and can also be used in the present invention.

In an advantageous embodiment, the cylinder is sealed and pressured water is injected into the cylinder as pressing means. This means that the cylinder is provided with some means to form a water tight enclosure in the inner of the cylinder. By applying water under sufficiently high pressure to the enclosure, the cylinder will undergo cold deformation, if applicable until it contacts the inner surface of the mould element, in particular the matrix structure. An advantage of this embodiment is that it is a relatively simple set-up without numerous mechanical parts that have to interact and have to be correctly adjusted.

In another preferred embodiment, the pressing of the cylinder is performed in multiple steps, for example, in two, three or four steps. In each of the steps, a portion of the cylinder is pressed or the whole cylinder is pressed such that only a part of the whole pressing process is completed. In the example laid out above, creating an inner texture comprising a polygon of straight segments, a method comprising three steps may be envisaged, performing pressing of the first third of line segments in the first step, performing pressing of a further third of line segments in the second step and performing pressing of the third of line segments in the third step.

Preferably, the length and/or pressing force of the pressing means in a radial direction is adjusted. In such an embodiment, the pressing means comprises adjustment means allowing the length and or the pressing force, in particular in the radial direction, to be adjusted. In this manner, it can be ensured that the pressing force can be applied to the cylinder with desired levels at specific circumferential positions of the cylinder.

The pressing means may be controlled by a controlling device, for example, by a computer program running on a suitable controlling device or computer.

In a further embodiment of the invention, the cylinder is hot-foamed, in particular at a temperature in the range of 600 to 700 degrees Celsius, and cooled after and/or during the forming process. An apparatus for performing the method may in this case further comprise cooling means for cooling the cylinder/rotor, if applicable the mould element or both. The step of forming may be performed during the forming process and/or after the forming process.

In a second aspect, the invention also concerns an apparatus for manufacturing a rotor according to the inventive method, comprising a pressing means. All features discussed with respect to the method can also be applied to the apparatus correspondingly.

In a preferred embodiment, the apparatus additionally comprises a mould element having a cavity for insertion of the cylinder. While the cavity is configured to receive the cylinder, the pressing means may be configured to be inserted into the cylinder already positioned inside the mould element. As described above, the mould element may comprise a matrix structure on its inner surface defining the cavity, and the pressing means may be hydraulic and/or electric and/or mechanical means.

BRIEF DESCRIPTION OF THE DRAWINGS

Further details and advantages ensue from the following detailed description of embodiments of the invention, taken in conjunction with the drawings, in which.

DETAILED DESCRIPTION OF INVENTION

Figure 1:
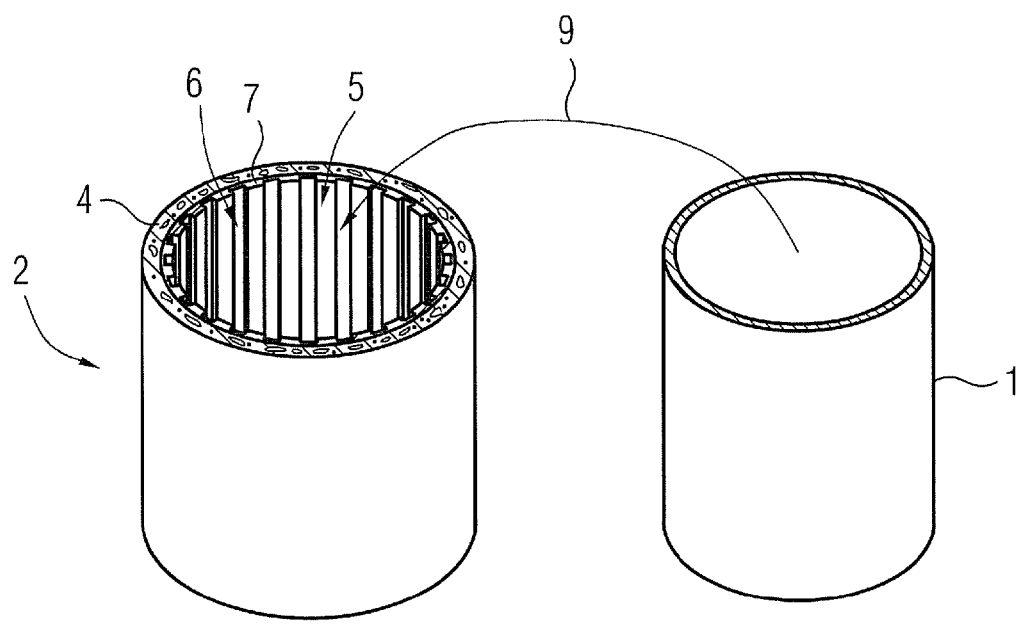
FIG. 1 illustrates a step of a first embodiment of the method of the invention.

As a first step of the inventive method for both embodiments discussed here, a hollow cylinder 1 is provided, in this case, wherein a rotor yoke for a wind turbine ("rotor" in the following) is to be manufactured, a rolled hollow cylinder 1 made of a suitable steel alloy or iron is used, which can be manufactured using processes known in the art. The cylinder 1 has a wall thickness of 40 mm and a diameter of 4 meters. The inner diameter of the cylinder 1 is slightly smaller than the desired inner diameter, and the length/height of the cylinder 5 is already equal to the desired length/height of the rotor.

In the first embodiment, the used apparatus comprises a mould element 2 and a pressing means 3. The mould element comprises a layer 4 of armoured concrete defining a cavity 5. The inner surface of the concrete layer has a matrix structure 6, in this case defined by a replaceable matrix structure insert 7. The matrix structure is chosen to correspond to a desired predetermined outer texture of the finished rotor. It is to be noted that the apparatus may comprise multiple inserts defining different outer textures.

Figure 2:
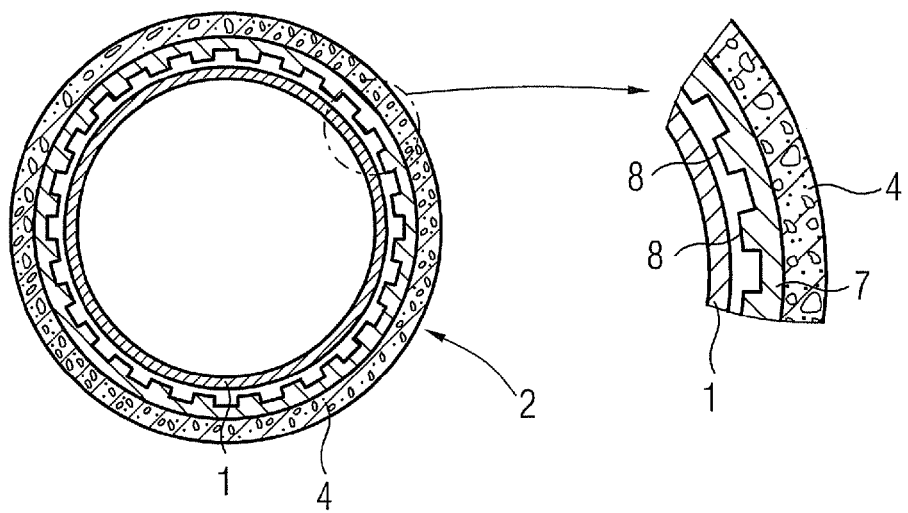
FIG. 2 shows a detail of a cylinder in a moulding element.

In this embodiment, the matrix structure 6 has protrusions 8, see e.g. FIG. 2, extending in the longitudinal direction. Generally speaking, the protrusions 8 may take various forms, widths and shapes, for example triangular, square and/or sine shapes. The whole matrix structure 6 is specially hardened.

The cavity 5 has a diameter which is larger than the outer diameter of the cylinder 1, so that in a second step of the inventive method, the cylinder 1 is placed inside the cavity 5 of the mould element 2, see arrow 9 in FIG. 1, so that the cylinder 1 is supported by the mould element 2, which actually in the further course of the process also serves as a mould. FIG. 2 shows the cylinder 1 placed inside the mould element 2.

Figure 3:
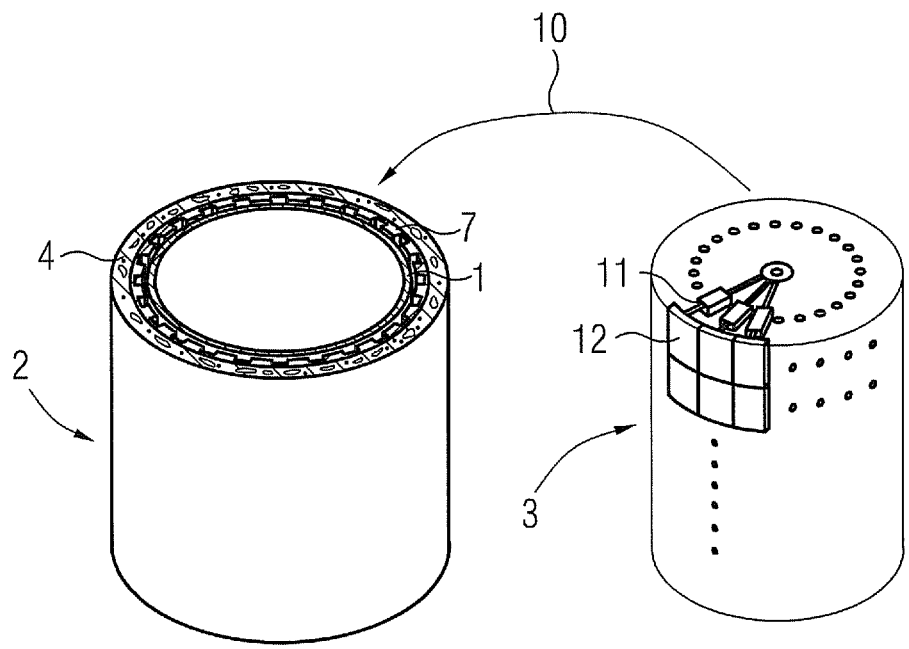
FIG. 3 illustrates a second step of the first embodiment of the invention.

In a next step of the first embodiment, see FIG. 3, the pressing means 3 is inserted into the cylinder 1, see arrow 10. In this exemplary embodiment, the pressing means of the apparatus comprises a plurality of pressing arms 11 adapted to exert a pressing force via a pressing plate 12 onto the cylinder 1. The pressing force is directed into the radial direction of the cylinder 1 and is generated by a hydraulic or pneumatic means not shown in the figures. It is noted, however, that the pressing force generating mains may also be electric and/or mechanic means.

The pressing means further comprises, for each arm 11, a length adjusting device 13. Alternatively or additionally, the pressing force can be adjusted. This allows to apply the pressing force to the cylinder 1 with desired levels at specific circumferential and/or longitudinal positions of the cylinder 1. The adjusting device 13, as well as the whole pressing means 3, is controlled by a controlling device (not shown), in this case by a computer program running on a computer.

While in the first embodiment shown in the figures an inner texture of the rotor is not needed, is should be noted at this point that the pressing means 3 can be designed to make inner surfaces of the rotor of various textures. For example, an inner texture may be formed for receiving pole magnets to be mounted to the rotor subsequently. In this case, the texture may have, in a cross-sectional view, a form of a polygon composed of a finite sequence of straight line segments, so that longitudinally extending seatings for magnets are formed.

Figure 4:
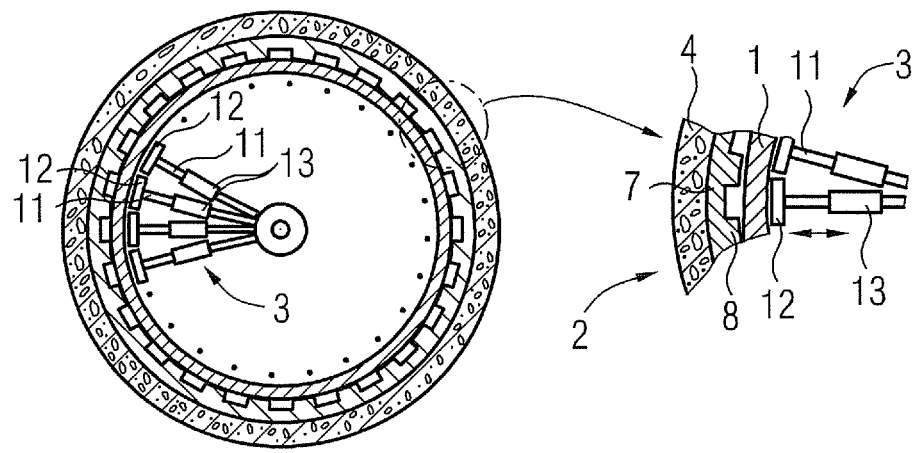
FIG. 4 shows a pressing means positioned inside the cylinder.

As the pressing means 3 is controlled by the controlling device and the lengths of the arms 11 and/or the pressing force can be adjusted, the now following pressing step of the inventive method can be performed either in one go or in multiple steps, for example three steps. In any case, starting from the situation in FIG. 4, the cylinder 1 is pressed so that it plastically deforms into the desired shape and size, defined by the pressing means 3 and the mould element 2.

Figure 5:
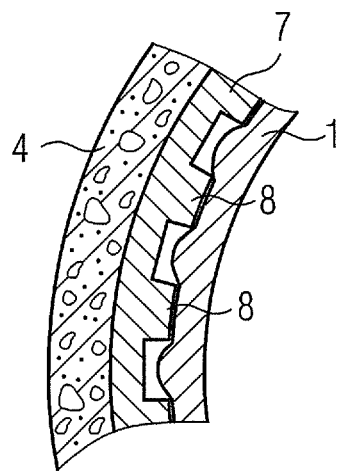
FIG. 5 a state during the pressing process.

FIG. 5 shows a state occurring during the pressing process of the first embodiment; the outer surface of the cylinder 1 already contacts the protrusions 8 of the matrix structure 6 while the material begins to fill the recesses between the protrusions 8, so that finally the desired texture is foamed.

The first embodiment can also be performed comprising hot forming, for example at a temperature between 600 to 700 degrees Celsius. If so, the apparatus also comprises cooling means not shown in the figures, configured to cool the cylinder 1 and/or the mould element 2 during and/or after the forming process.

Finally, the cylinder 1 is removed from the mould element 2 as the desired rotor.

It should also be noted that the present invented method is not limited to the manufacture of "outer rotor" type rotor yokes, where magnets are to be mounted on the inner wall of the rotor yoke. The method of the invention may, mutatis mutandis, be used for manufacturing "inner rotor" type rotor yokes where magnets are to be mounted in the outer wall of the yoke.

As for manufacturing said inner rotor type rotor yokes, the cylinder 1 may, for various embodiments, be places around a mould element which is prepared for receiving a suitable cylinder of the type.

Figure 6:
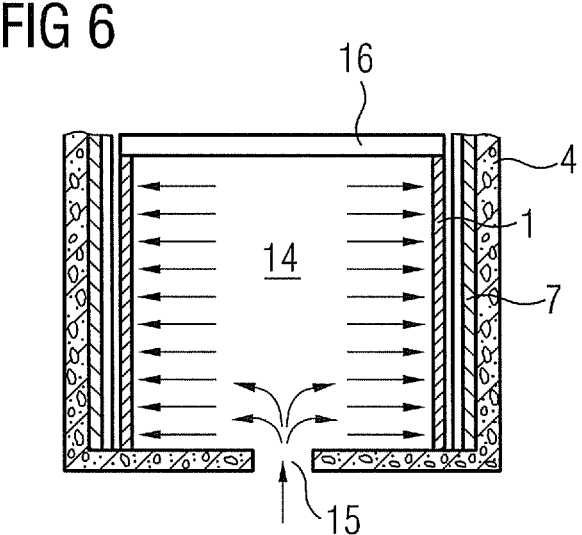
FIG. 6 illustrates a modified second step in a second embodiment of the method of the invention.
Figure 7:
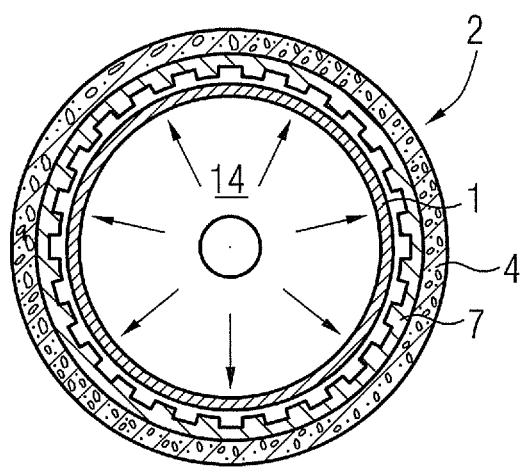
FIG. 7 shows a cylinder filled with pressured water in a cross-sectional view.

FIGS. 6 and 7 illustrate a second, modified embodiment of the invention, wherein water 14 is used as a pressing means.

In this embodiment, water 14 is injected into the cylinder 1 using an inlet 15, which is again arranged inside the mould element 2. The provide a water tight enclosure in the inner of the cylinder 1, suitable sealing means 16 are used. At a sufficiently high pressure, water 14 is inlet into the enclosure, so that the cylinder 1 undergoes cold deformation. The forming process ends once the cylinder 1 contacts the matrix structure 6, acquiring the respective outer texture.

In a third embodiment (not illustrated), the cylinder is formed substantially as described in the first embodiment but without being inserted into or around a mould element 2. For this embodiment the formed size and shape of the cylinder 1 is exclusively determined by the pressing means 3 contacting the inner or outer surface of the cylinder 1.

The invention claimed is:

1. A method of manufacturing a rotor for an electrical machine, comprising:
    providing a hollow metal cylinder; and
    plastically deforming the hollow metal cylinder permanently to a predetermined shape and to a predetermined size;
    providing a pressing unit arranged inside or around the cylinder; and
    applying a pressing force via the pressing unit to at least at of an inner or outer,
    wherein the pressing force is applied while the hollow metal cylinder is arranged inside a cavity of an mould element, and
    wherein the mould element comprises a matrix structure, in particular comprises a protrusion, which corresponds to a predetermined texture on an outer wall of the rotor.

2. The method according to claim 1, wherein the plastically deforming of the hollow metal cylinder comprises
    cold forming and/or
    hot forming and/or
    work hardening the cylinder.

3. The method according to claim 2, wherein the cylinder is hot-formed, in particular at a temperature in the range of 600 to 700 degrees Celsius, and cooled after and/or during the forming process.

4. The method according to claim 1, wherein a pressing force in a radial direction of the cylinder is applied.

5. The method according to claim 1, wherein a surface of the pressing unit contacting the cylinder is structured such that a contacted surface of the cylinder takes a predetermined texture.

6. The method according to claim 1, wherein the pressing force is applied while the hollow metal cylinder is arranged inside a cavity of an mould element.

7. The method according to claim 6, wherein the mould element comprises a layer of armoured concrete.

8. The method according to claim 1, wherein the pressing force is applied while an inner mould element is arranged inside a cavity of the hollow metal cylinder.

9. The method according to claim 8, wherein the mould element comprises a layer of armoured concrete.

10. The method according to claim 8, wherein the mould element comprises a matrix structure, in particular comprises a protrusion, which corresponds to a predetermined texture on an inner wall of the rotor.

11. The method according to claim 10, wherein the mould element comprises a replaceable matrix structure insert.

12. The method according to claim 1, wherein the mould element comprises a replaceable matrix structure insert.

13. The method according to claim 1, wherein the pressing unit applies pressure on the cylinder using hydraulic means.

14. The method according to claim 1, wherein the pressing unit applies pressure on the cylinder using electric means.

15. The method according to claim 1, wherein the pressing unit applies pressure on the cylinder using mechanical means.

16. The method according to claim 1, wherein the hollow metal cylinder is sealed and pressured water is injected into the cylinder as pressing unit.

17. The method according to claim 1, wherein a pressing of the cylinder is performed in multiple steps and/or the length and/or pressing force of the pressing unit in a radial direction is adjusted and/or the pressing unit is controlled by a controlling device.

* * * * *